Feb. 24, 1959 N. A. CARTER ET AL 2,874,818
ARTICLE DIVERTER FOR ROLLER CONVEYORS
Filed March 31, 1955
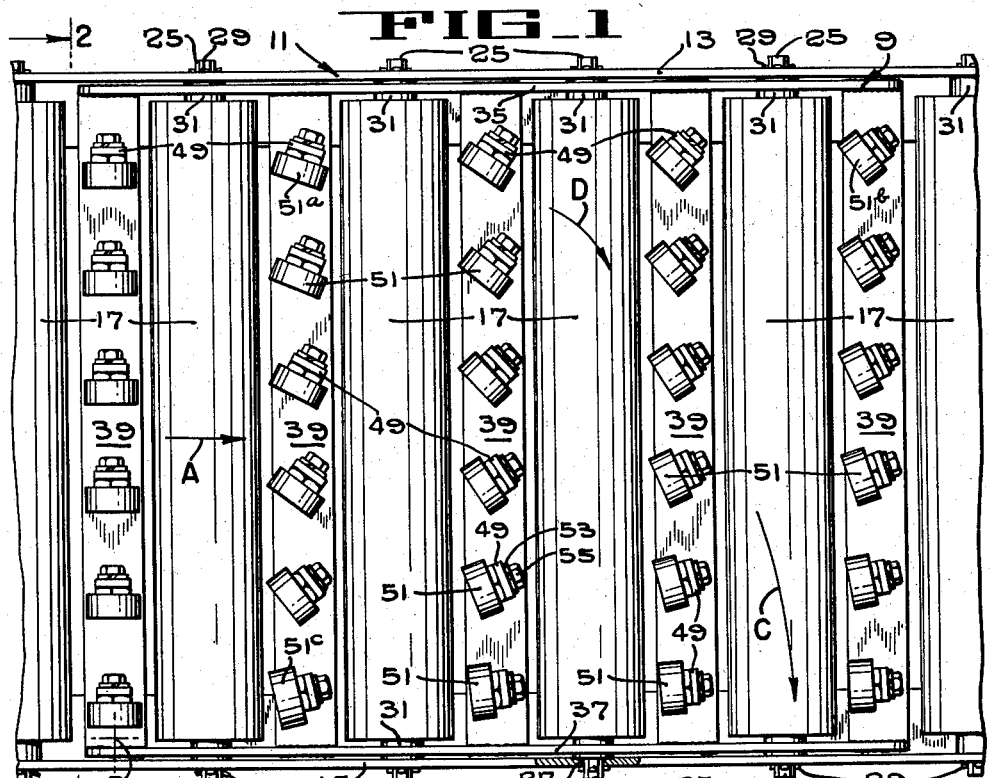
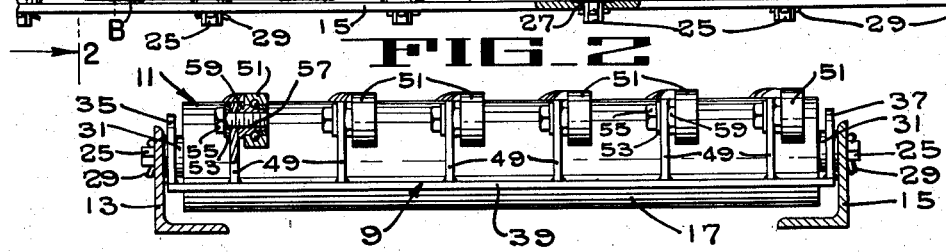
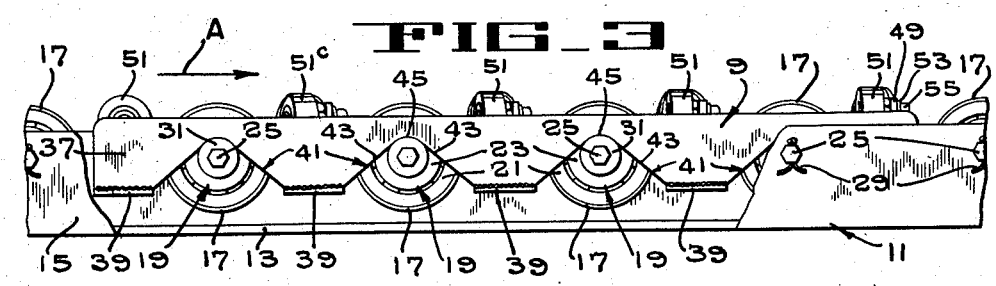
INVENTORS
NEWELL A. CARTER
VINCENT E. HEMBORG
BY *Hans G. Hoffmeister*
ATTORNEY United States Patent Office 2,874,818
Patented Feb. 24, 1959

2,874,818
ARTICLE DIVERTER FOR ROLLER CONVEYORS

Newell A. Carter and Vincent E. Hemborg, Riverside, Calif., assignors to Food Machinery and Chemical Corporation, San Jose, Calif., a corporation of Delaware Application March 31, 1955, Serial No. 498,177

12 Claims. (Cl. 193—36)

The present invention relates to apparatus for diverting articles from roller conveyors.

One object of the present invention is to provide a portable article diverter for roller conveyors.

Another object is to provide a portable article diverter that may be disposed at any point along a roller conveyor to remove articles therefrom.

Another object is to provide an article diverter for roller conveyors that is compact and which will gently and quickly remove articles from a roller conveyor.

Another object is to provide an article diverter for roller conveyors that will remove articles laterally from a conveyor and rotate them a quarter turn.

These and other objects and advantages of the present invention will become apparent from the following description and accompanying drawings in which:

Fig. 1 is a fragmentary plan view of a roller conveyor having the present article diverter associated therewith.

Fig. 2 is a transverse section taken along lines 2—2 of Fig. 1 with certain parts broken away.

Fig. 3 is a side elevation of the apparatus shown in Fig. 1 with certain parts broken away.

The present article diverter 9 (Fig. 1) is shown associated with a gravity type roller conveyor 11 of conventional construction arranged to cause articles placed thereon to move in the direction of the arrow A (Figs. 1 and 3). It should be noted, however, that the present diverter is not limited to use with gravity type conveyors and that it is equally capable of use with the power driven type of roller conveyors.

The gravity type roller conveyor 11 comprises two, parallel, side rails 13 and 15 supported by any convenient means (not shown) so that they incline downwardly to the right as viewed in Fig. 3. It also comprises a multiplicity of equally spaced, parallel, cylindrical, article supporting and advancing rollers 17 mounted transversely between the side rails for free rotation. To obtain this free rotatable mounting of the cylindrical rollers 17 said rollers are provided at their opposite ends with ball bearings 19 (Fig. 3), the outer races 21 of which are secured to the rollers 17 and the inner races 23 of which are mounted on stationary hexagonal axles 25 which are received in transversely aligned, hexagonal apertures 27 formed in the side rails 13 and 15. The axles 25 are held against movement transversely of the conveyor 11 by cotter pins 29 which are received in holes provided near the ends of the axles 25 and which abut the outer sides of the side rails 13 and 15. The rollers 17 are not as long as the distance between the side rails 13 and 15 and to prevent movement of the rollers 17 transversely of the conveyor 11 on their stationary axles 25, the inner bearing races 23 are formed with bosses 31 (Fig. 2) which extend outward beyond the ends of the rollers and abut the inner surface of the side rails 13 and 15.

The article diverter 9 comprises two parallel side plates 35 and 37 connected by a plurality of parallel transverse bars 39 which are welded to the lower margins of the side plates 35 and 37 at intervals equal to the spacings between the conveyor rollers 17, so that upon mounting of the diverter on the conveyor, the bars 39 may lie between the conveyor rollers. The side plates 35 and 37 are so spaced by the bars 39 that the plates will straddle the rollers 17, and the lower edges of the plates will rest on the outwardly extending bosses 31 of the roller support bearings 19 when the diverter is lowered onto the conveyor for disposition at the point where articles are to be discharged from the conveyor 11. From the above, it will be seen that the diverter is so constructed that the primary means for its support on the conveyor 11 are the axles 25 of the conveyor rollers 17.

To maintain the diverter at its desired position on the conveyor 11 and yet make it easily mountable on and demountable from said conveyor, the side plates 35 and 37 have their lower margins recessed between the points of attachment of the bars 39, as shown at 41 (Fig. 3), to receive the bosses 31 of the bearings 19. The recesses 41 are formed with steep sides 43 which meet in a curved portion 45 that is adapted to closely overlie the upper surface of the bosses 31 when the diverter is in position on the conveyor 11, as shown in Fig. 3. In this manner the diverter is held firmly on the roller axles 25 and is prevented from moving longitudinally of the conveyor 11.

Each of the bars 39 of the diverter is provided with a plurality of lugs 49 that rise from its upper surface. Each of the lugs 49 carries a roller 51 of the ball bearing type mounted thereon for rotation in a vertical plane. Thus, the diverter 9 is provided with a plurality of spaced, transversely extending rows of rollers 51. The rollers 51 (Fig. 2) are all identical and they are held in place on the lugs 49 by lock washers 53 and tap bolts 55, the latter being adapted to mate with threaded central apertures 57 in the inner races 59 of the rollers 51. The rotational axes of the rollers 51 are so arranged that when the diverter is resting in position on the conveyor 11, said axes are all in a plane substantially parallel to the plane that contains all the conveyor roller axles 25 and the crest portions of the rollers 51 lie slightly above the crest portions of the conveyor rollers 17, as shown in Figs. 2 and 3.

While, as previously mentioned, the rollers 51 are each positioned for rotation in a vertical plane, no two rollers are entirely in the same vertical plane, the disposition of said rollers being such that their rotational axes intersect at a substantially common point B (Fig. 1), which is located at the front of the diverter 9 adjacent the side thereof at which articles are to be discharged. This radial arrangement of the rollers 51 about the point B provides on the foremost transverse bar 39 a transverse row of parallel rollers 51 that turn about a common axis extending transversely of the conveyor. These rollers are the first rollers to contact articles as they move onto the diverter. However, they do not act to divert the articles, but are solely for the purpose of raising the articles onto the other rollers of the diverter and, hence, will be termed lifting rollers.

The rollers 51 behind those on the foremost bar 39 cause the diversion of the articles passing onto the diverter and, hence, they will be called diverting rollers. The diverting action of these rollers arises from the fact that they are all so arranged that their planes of rotation form acute angles with the path of articles traveling on the conveyor 11. Thus, when articles move onto the diverting rollers the articles will follow the path of least resistance and will move toward the side of the conveyor toward which the rollers are angled in an arcuate path about point B.

It is to be noted that the aforesaid radial disposition of the diverting rollers 51 with respect to the point B (Fig. 1) results in an arrangement wherein the rotational planes of the longitudinally aligned diverting rollers 51 in consecutive transverse rows of such rollers form, with the path of articles traveling on conveyor 11, acute angles of progressively greater size toward the posterior of the diverter, as may be seen in Fig. 1 by comparing the angularity of the roller 51a with that of the roller 51b. Because of this increasing angularity of the longitudinally aligned diverting rollers in consecutive transverse rows thereof toward the posterior of the diverter, articles moving over the diverter in the direction of arrow A (Fig. 1) are met by an increasing resistance to their continued advancement in the direction of the arrow A and a decreasing resistance to their movement laterally on the diverter in the general direction of arrow C (Fig. 1). Thus, the increasing angularity of the longitudinally aligned diverting rollers results in an increase in the diversionary effect of said rollers on the articles moving thereover.

In addition the aforesaid radial disposition of the rollers 51 with respect to point B (Fig. 1) results in an arrangement wherein the rotational planes of the individual rollers in each transverse row of rollers form, with the path of articles traveling on the roller conveyor 11, acute angles of a progressively greater size toward the discharge side of the diverter, as may be seen in Fig. 1 by comparing the angularity of the roller 51a with that of the roller 51c. With this arrangement the rotational planes of the diverting rollers in the longitudinal rows of such rollers at the discharge side of the diverter form larger acute angles with the direction of movement of articles on conveyor 11 than do the rotational planes of the diverting rollers 51 in the longitudinal rows of rollers at the opposite side of the diverter. Therefore, the diverting rollers 51 at the discharge side of the diverter will exert a larger resistance to the movement of articles thereover in the direction of the arrow A (Fig. 1) than will the diverting rollers 51 at the opposite side of the diverter. As a consequence, articles moving onto the diverting rollers 51 in the direction of the arrow A (Fig. 1) will be caused to rotate sharply in the direction of the arrow D (Fig. 1) about their central vertical axes.

In use, the diverter 9 is placed on the conveyor 11 at the point therealong where it is desired to remove the articles therefrom. Any point along the conveyor 11 may be chosen as a discharge station for articles since no special apparatus is required to mount the diverter firmly in place wherever desired on the roller conveyor 11. The placement of the diverter 9 on the conveyor is accomplished by positioning it directly over the conveyor 11 with its foremost bar 39 on the upstream side of the conveyor and with the recesses 41 of its side plates 35 and 37 engaging the bearing bosses 31. With the diverter in operative position its rollers 51 will be disposed slightly higher than the conveyor rollers 17 so that articles rolling onto the rollers 51 from the conveyor 11 will move out of contact with the rollers 17. Nothing further need be done to firmly position the diverter in place on the conveyor since by reason of the contour of the recesses 41 the diverter will be held against movement longitudinally of the conveyor and by reason of the proximity of the side rails 13 and 15 to the diverter side plates 35 and 37 the diverter will be held against substantial lateral movement.

Articles, such as paperboard cases filled with cans, or the like, may then be placed one at a time on the gravity conveyor 11 at an elevated point and they will immediately begin to move downward over the conveyor rollers 17 toward the diverter 9. By the time the cases reach the diverter they have attained considerable momentum, and when they encounter the lifting rollers 51 they will easily ride up on said rollers and onto the diverting rollers therebehind. The diverting rollers will then cause the cases to turn sharply clockwise, as viewed in Fig. 1, due to the greater resistance to movement in the direction of the arrow A (Fig. 1) which said rollers apply to the bottom of the cases at the side thereof nearest the discharge side of the diverter than they apply to the bottom of the cases at the side thereof remote from the discharge side of the diverter. Simultaneously, with this turning of the cases, said cases move laterally on the diverter by following the line of least resistance in the general direction of the arrow C. By the time the cases have been turned clockwise (Fig. 1) a quarter of a turn they are in position for discharge from the diverter 9 over the side plate 37 and onto any desired support, such as a table, gravity chute, or the like.

It is to be noted that since in discharging cases from the conveyor 11 the diverter 9 turns the cases clockwise one quarter turn, the cases are discharged from the diverter with the same side facing forward as when cases were supplied to the conveyor 11. Thus, the orientation of the cases with respect to their line of travel is maintained, so that markings, labels, etc. on the cases will remain within easy view of any personnel and/or devices positioned near the diverter to handle or inspect the cases.

While a preferred embodiment of the present invention has been described, it will be understood that various changes and modifications may be made in the details thereof without departing from the spirit and scope of the appended claims.

Having thus described the invention what is claimed as new and desired to be protected by Letters Patent is:

1. For a roller conveyor having a plurality of article supporting rollers mounted on axles spaced longitudinally of the conveyor an article diverter comprising a frame having side plates arranged to rest solely on the conveyor roller axles, and a plurality of article diverting rollers rotatably fastened to the frame to extend above the conveyor rollers when the frame side plates are rested on the conveyor roller axles.

2. For a roller conveyor having a plurality of article supporting rollers mounted on parallel axles spaced longitudinally of the conveyor, a portable article diverter comprising a frame having parallel side plates adapted to extend longitudinally of the conveyor and having their lower edges provided with recesses adapted to receive and fit over the roller axles, and a plurality of diverting rollers rotatably secured to the frame and so arranged that their crest portions lie above the conveyor rollers when the frame is mounted on the conveyor by resting its side plates on the conveyor roller axles.

3. For a roller conveyor having a plurality of article supporting rollers mounted on axles spaced longitudinally of the conveyor, a portable article diverter comprising two transversely spaced parallel side plates, longitudinally spaced transversely extending bars rigidly connecting said plates, said side plates being arranged to rest on the conveyor roller axles to thereby support the diverter on the conveyor and having recesses formed in their lower margins to receive said axles to prevent longitudinal movement of the diverter on the conveyor, and a multiplicity of article diverting rollers so supported by said bars that when said diverter is rested on the conveyor the crest portions of said diverting rollers lie higher than the crest portions of the conveyor rollers adjacent said diverting rollers.

4. For a roller conveyor having a plurality of article supporting rollers mounted on axles spaced longitudinally of the conveyor, an article diverter comprising a frame constructed and arranged for support on the conveyor roller axles and disposed entirely within the lateral confines of the roller conveyor, and a plurality of article diverting rollers rotatably mounted on the frame on axes disposed at different angles with respect to each other and directed to intersect at a common point within the confines of the diverter.

5. For a roller conveyor having a plurality of article supporting rollers mounted on axles spaced longitudinally of the conveyor, a portable article diverter comprising a frame having side plates arranged to be supported by the conveyor roller axles entirely within the lateral confines of the conveyor, and a plurality of article diverting rollers rotatably mounted on the frame on axes intersecting at substantially the same point, said axes being so disposed that the crest portions of the diverting rollers are positioned higher than the conveyor rollers when said frame is supported on the conveyor by resting the side plates on the conveyor roller axles.

6. For a roller conveyor adapted to convey articles in a predetermined direction and having a plurality of elongated, cylindrical article supporting rollers mounted on axes spaced longitudinally of the conveyor, an article diverter comprising a frame adapted for support upon the conveyor adjacent a point where it is desired to divert articles laterally from the conveyor, a lifting roller rotatably supported by said frame so that when the frame is supported on the conveyor said lifting roller will be disposed ahead of and above one of the conveyor rollers adjacent the article diversion point on an axis parallel to said one conveyor roller to lift articles traveling on the conveyor in said predetermined direction above said one conveyor roller, and a plurality of diverting rollers rotatably supported by said frame behind said one conveyor roller in rows disposed between the cylindrical rollers and on axes extending obliquely to said predetermined direction to receive articles from said lifting roller and to divert them laterally from said roller conveyor.

7. For a roller conveyor having a plurality of longitudinally spaced, article supporting rollers an article diverter comprising a frame adapted to be supported by the conveyor, and a plurality of article diverting rollers rotatably supported on the frame and so disposed that when said frame is operatively supported on the conveyor said rollers are higher than the adjacent conveyor rollers to receive articles from the conveyor rollers and hold the articles out of contact with the same, the axes of said diverting rollers being arranged at different angles with respect to each other and disposed to intersect at a common point within the lateral limits of the conveyor to turn articles received by said diverting rollers and to discharge them laterally from the conveyor.

8. For a roller conveyor having a plurality of longitudinally spaced, article supporting rollers an article diverter comprising a frame adapted to be supported by the conveyor, and a plurality of article diverting rollers rotatably supported by the frame in rows extending transversely of the diverter for disposition higher than the conveyor rollers when said frame is operatively mounted on the conveyor, the axes of the diverting rollers in each row forming acute angles with the longitudinal center line of the diverter to discharge articles from the conveyor over a predetermined side thereof, said acute angles in each row being of progressively smaller size toward said predetermined side of the diverter.

9. For a roller conveyor having a plurality of elongated, cylindrical article supporting rollers mounted on axes spaced longitudinally of the conveyor, an article diverter comprising a frame adapted for mounting on the conveyor, and a plurality of article diverting rollers rotatably secured to the frame in rows disposed between the cylindrical rollers and on axes intersecting at substantially the same point to discharge articles laterally from the conveyor, said axes being so disposed that when said frame is mounted on the conveyor the diverting rollers are disposed higher than the conveyor rollers.

10. For a roller conveyor having a plurality of article supporting rollers mounted on axes spaced longitudinally of the conveyor and arranged to carry an article, an article diverter comprising a frame adapted for mounting on the conveyor, and a plurality of individually mounted article diverting rollers rotatably fastened to the frame in fixed angular position on axes intersecting at a point disposed inwardly of the frame on the side of the diverter toward which articles are to be diverted to cause each article to pivot about the point of intersection of the axes whereby to discharge articles laterally from the conveyor, said axes being so disposed that when said frame is mounted on the conveyor the diverting rollers are disposed between the conveyor rollers and have their crest portions disposed higher than said conveyor rollers.

11. An article diverter for use with a roller conveyor having a plurality of articles supporting rollers mounted on axles spaced longitudinally of the conveyor, said article diverter comprising a frame constructed and arranged for support on the conveyor roller axles, and a plurality of article diverting rollers rotatably mounted on the frame on axes directed to intersect at a common point, said diverter being of such a size as to be positioned entirely within the lateral limits of the conveyor.

12. An article diverter for use with a roller conveyor having a plurality of elongated cylindrical rollers mounted on axles spaced longitudinally of the conveyor, said article diverter comprising a frame constructed and arranged for support on the conveyor roller axles, and a plurality of article diverting rollers rotatably mounted on the frame in rows between the elongated cylindrical conveyor rollers and disposed on axes directed to intersect at a common point within the lateral limits of the conveyor.

References Cited in the file of this patent
UNITED STATES PATENTS

| | | |
|---|---|---|
| 2,457,408 | Sebastian | Dec. 28, 1948 |
| 2,613,790 | Schottelkotte | Oct. 14, 1952 |